(12) United States Patent
Gonzalez et al.

(10) Patent No.: US 6,496,642 B2
(45) Date of Patent: *Dec. 17, 2002

(54) OPTICAL FIBER CABLE ROUTING GUIDE

(75) Inventors: Herb Gonzalez, Arvada, CO (US); Gary Gustafson, Westminster, CO (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/310,449

(22) Filed: May 12, 1999

(65) Prior Publication Data

US 2002/0122652 A1 Sep. 5, 2002

(51) Int. Cl.[7] .............................. G02B 6/36; G02B 6/00
(52) U.S. Cl. ........................ 385/136; 385/86; 385/137
(58) Field of Search .......................... 385/86, 135, 136, 385/137, 139, 87, 134

(56) References Cited

U.S. PATENT DOCUMENTS

| 5,530,787 A | * | 6/1996 | Arnett ........................ 385/137 |
| 5,640,476 A | * | 6/1997 | Womack et al. ............... 385/86 |
| 5,640,482 A | | 6/1997 | Barry et al. ............. 385/137 X |
| 5,710,851 A | * | 1/1998 | Walter et al. ................. 385/86 |
| 5,835,660 A | | 11/1998 | Jung et al. .................. 385/137 |
| 5,933,557 A | * | 8/1999 | Ott .............................. 385/86 |
| 6,134,370 A | * | 10/2000 | Childers et al. ............ 385/135 |

OTHER PUBLICATIONS

StorageTek Design #4112197.

* cited by examiner

Primary Examiner—Hemang Sanghavi
Assistant Examiner—Omar Rojas
(74) Attorney, Agent, or Firm—Altera Law Group, LLC

(57) ABSTRACT

An optical fiber cable routing guide for bending an optical fiber cable while protecting the optical fiber cable from sharp bends that could cause optical fiber damage or degradation of signal transmission. The cable routing guide is made in the form of an elongated curved channel to receive and bend an optical fiber cable and the enclosing strain relief boot at an optical fiber cable connector. One end of the elongated curved channel is shaped to make abutting contact with the cable connector and has protruding studs shaped to prevent rotation of the cable routing guide relative to the cable connector. The cable routing guide is easily installed without the need for tools and provides compact installation and routing of optical fiber cables within an enclosure.

18 Claims, 3 Drawing Sheets

OPTICAL FIBER CABLE ROUTING GUIDE

BACKGROUND OF THE INVENTION

1. Field of the Invention

This invention relates in general to a guide for an optical fiber signal transmission cable and, more particularly, to an optical cable routing guide to direct the optical cable direction while minimizing signal transmission degradation and strain on the optical fiber.

2. Description of Related Art

Optical fibers are becoming more commonly used for signal transmission in communications and information handling applications. Optical fibers provide a large increase in the signal transmission bandwidth of a transmission cable compared to the bandwidth provided by conventional wire transmission cables. The increased bandwidth of optical transmission cables allows a greatly increased amount of signal data to be transmitted over comparably sized cables. In information handling applications, such as computer systems having large information storage capabilities, optical fiber transmission cables are used to provide connections between units of the computer system in order to most efficiently transmit large amounts of information from unit to unit. One example would be an ESCON interface between the computer systems.

While optical fiber cables provide a bandwidth advantage over the use of wire cables, the optical fibers have the disadvantage of being more fragile than metallic wires. Care in handling and in routing optical fiber cables is imperative to avoid damage to the optical fibers which can result in degradation of signal transmission. Sharp bends of the optical fibers in routing optical fiber cables must be avoided. Excessively sharp (small radius) bends can introduce microcracks in the optical fiber which degrades the transmission of optical signals. Also, because of the laws of optics governing light transmission, a small radius bend of the optical fiber can result in signal loss due to some of the transmitted light leaking out of the fiber at the bend.

The prior art recognizes the need to control routing of optical fibers and optical fiber cables by providing troughs for supporting optical fiber cables including curved troughs having a minimum radius of curvature to prevent bending of the optical cable too sharply. In addition, assemblies to provide strain relief of the optical fiber at optical fiber cable connectors connecting the cables to system units are known to the art. U.S. Pat. No. 5,530,787 to Arnett discloses an optical fiber guide for preventing sharp bends having a sleeve mounting member for mounting to a optical fiber connector. STK drawing 4112197 shows a similar approach. There are problems encountered with these approaches however. Specifically, the prior art ESCON connector brace strain relief depended upon the structure around the connector to prevent twisting, and additionally, it would only bend the strain relief in one direction.

For applications where system units are mounted on drawers or racks in enclosures such as cabinets, there is a need to protect the optical fiber cables from sharp bends at the connectors to the system units when drawers are moved and cabinet doors are closed. Since compactness of system unit mounting in an enclosure is a desirable feature, the protective guides for the optical cables should be as compact as possible and should be adaptable for directing the optical fiber cables in different directions.

Therefore there is a need for an optical fiber cable guide that is compact, easily installed and is adaptable to cable direction while providing the necessary protection from sharp bends.

SUMMARY OF THE INVENTION

It is an object of the present invention to disclose an optical fiber cable routing guide for protecting an optical fiber cable from sharp bends at or near to a cable connector that is totally independent of the surrounding structure in providing strain relief.

It is another object of the present invention to disclose an optical fiber cable routing guide that is attachable to the cable by pressing onto a connector strain relief boot connected to a optical fiber cable connector.

It is a further object of the present invention to disclose an optical fiber cable routing guide that may be attached to direct an optical fiber cable in either of two directions.

It is yet another object of the present invention to disclose an optical fiber cable routing guide that is easily installed without the need for tools and provides compact installation of optical fiber cables within an enclosure.

In accordance with the principles of the present invention, there is disclosed an optical fiber cable routing guide comprising an elongated curved channel having a generally U-shaped cross-section formed by an inner curved wall, an outer curved wall and a base. The curved channel supports and guides the direction of an optical fiber cable enclosed in a strain relief boot fixed to an optical fiber cable connector. A proximal end of the elongated curved channel is shaped to make abutting contact with the optical fiber cable connector so that protruding stud elements of the inner curved wall, the outer curved wall and the base prevent rotation of the cable routing guide relative to the cable connector. A distal end of the elongated curved channel is shaped to receive a collar feature on the strain relief boot to constrain the position of the cable routing guide on the strain relief boot with the proximal end of the curved channel in abutting contact with the cable connector.

The elongated curved channel is formed to have a radius of curvature to bend the optical fiber cable through an angle, usually in the range of 90°, while protecting the optical fiber cable from sharp (small radius) bends that could cause optical fiber damage or degradation of signal transmission. By choosing the radius of curvature of the curved channel to be as small as possible consistent with the bending constraints on the optical fibers and by reducing the length of the curved channel, the space needed to bend the cable through 90° is minimized.

The optical fiber cable routing guide is manually installed over the strain relief boot fixed to the optical fiber connector without the need for any tools or fixtures such as clamps, clips or other holding means. The strain relief boot, as is known to the art, is a hollow tube formed of resilient material having a first end fixed to the optical fiber cable connector and a second end extending away (usually in the range of 1–3 inches) from the connector. The optical fiber cable is inserted through the tube of the strain relief boot into the connector for connection of the optical fibers as is well-known to those skilled in the art. The optical fiber cable guide is installed by inserting the strain relief boot into the opening of the U-shaped cross-section of the elongated curved channel forming the cable guide and pushing the cable guide toward the cable connector to make abutting contact of the proximal end of the curved channel with the cable connector. A collar at the second end of the strain relief boot is fitted into the shaped distal end of the curved channel to prevent the cable guide from moving away from abutting contact with the cable connector. The optical fiber cable guide may be installed on the strain relief boot in either of two orientations providing the ability to bend the optical fiber cable in a first direction, or alternatively, by rotating the optical fiber cable guide by 180° with respect to the cable connector, to bend the optical fiber cable in a second direction opposite to the first direction.

The above, as well as additional objects, features, and advantages of the present invention will become apparent in the following detailed written description.

BRIEF DESCRIPTION OF THE DRAWINGS

The following description is the best embodiment presently contemplated for carrying out the present invention. This description is made for the purpose of illustrating the general principles of the present invention and is not meant to limit the inventive concepts claimed herein.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 1A:
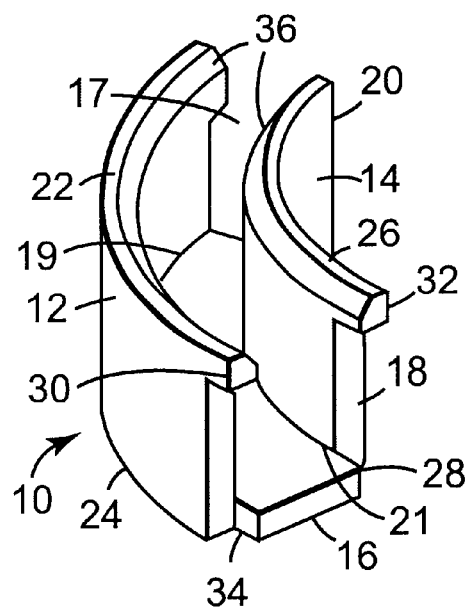
FIG. 1a is an isometric view (not to scale) of the optical fiber cable routing guide of the present invention showing detail of the proximal end that abuts with the optical fiber cable connector.
Figure 1B:
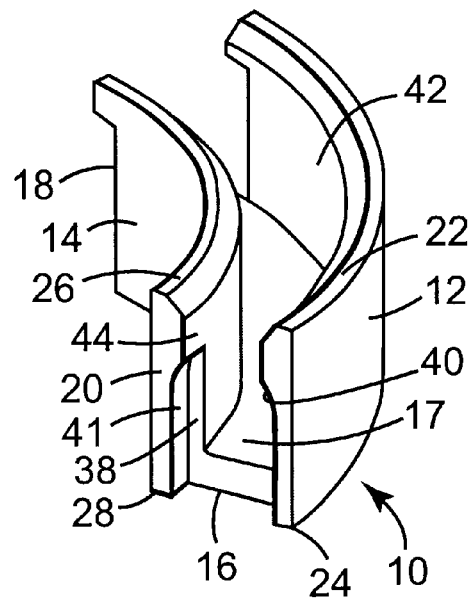
FIG. 1b is an isometric view (not to scale) of the optical fiber cable routing guide of the present invention showing detail of the distal end.

FIGS. 1a and 1b are isometric views of an optical fiber cable routing guide 10 according to the preferred embodiment of the present invention. The cable routing guide 10 has the form of an elongated curved supporting member having an inner curved wall 14, an outer curved wall 12 and a base 16 forming an elongated curved channel 17 having a generally U-shaped cross-section for guiding the direction of an optical fiber cable along the length of the curved channel 17. FIG. 1a shows the cable routing guide 10 as viewed from a proximal end 18 shaped to make abutting contact with an optical fiber cable connector (not shown). FIG. 1b shows the cable guide 10 as viewed from a distal end 20.

The outer curved wall 12 has an upper edge 22 and a lower edge 24, and similarly, the inner curved wall 14 has an upper edge 26 and a lower edge 28. The base 16, disposed between the outer curved wall 12 and the inner curved wall 14, has a first edge 21 fixed to the lower edge 28 of the inner curved wall 14 and a second edge 19 fixed to the lower edge 24 of the outer curved wall 12 to form the curved channel 17. The upper edges 22, 26 of the outer curved wall 12 and inner curved wall 14, respectively, have bevelled corners 36 at the edges defining the opening of the U-shaped cross-section of the curved channel 17. The bevelled corners 36 at the opening of the U-shaped cross-section facilitate installation of the cable routing guide 10.

The proximal end 18 of the curved channel 17 is formed to have protruding studs 30 and 32 at the upper edges 22, 26 of the outer curved wall 12 and inner curved wall 14, respectively. The base 16 protrudes beyond the proximal end 18 to form a base protruding stud 34. The protruding studs 30, 32 and the base protruding stud 34 are shaped to prevent rotation of the cable guide 10 relative to an optical fiber cable connector (not shown) when the proximal end 18 of the curved channel 17 is in abutting contact with the connector.

The distal end 20 of the curved channel 17 is shaped to have a recessed surface 38 formed by bevels 40 and 41 of the inner surfaces 42, 44 of the outer curved wall 12 and the inner curved wall 14, respectively, and the recessed surface of the base 16. The bevels 40, 41 extend from the lower edges 24 and 28 part way toward the upper edges 22 and 26 of the outer curved wall 12 and the inner curved wall 14, respectively, to form the recessed surface 38 to receive a protruding collar at the second end of a strain relief boot attached to the cable connector (not shown).

Figure 2:
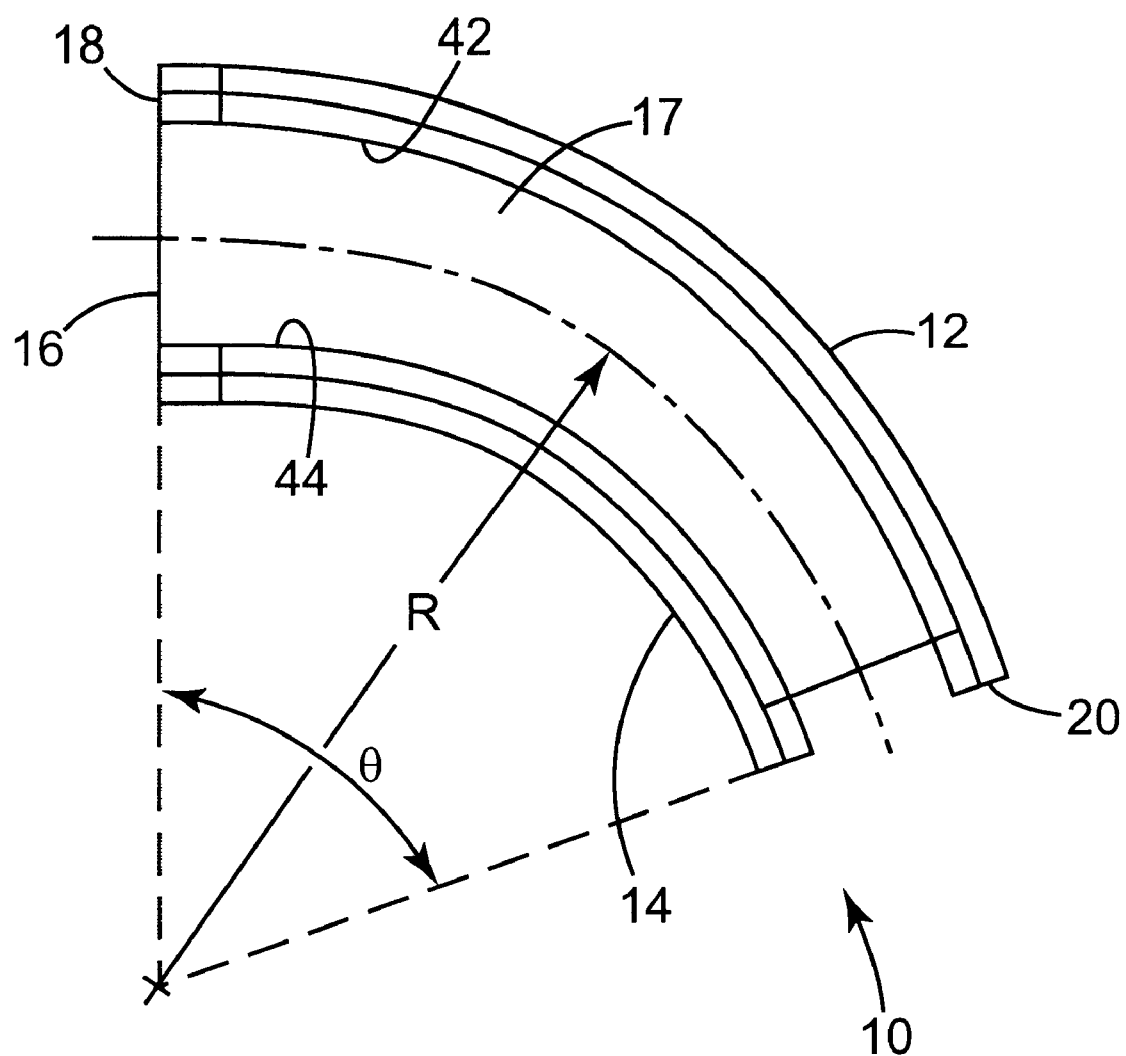
FIG. 2 is a plan view (not to scale) of the optical fiber cable routing guide of the present invention.

FIG. 2 is a plan view of the optical fiber cable routing guide 10 according to the preferred embodiment of the invention. The cable routing guide 10 is formed to have a constant radius of curvature R at a center line of the curved channel 17. Alternatively, a variable radius of curvature may be used at a sacrifice to the compact size of the guide. The channel width, defined as the spacing between an inside surface 42 of the outer curved wall 12 and an inside surface 44 of the inner curved wall 14, decreases gradually from a maximum width at the proximal end 18 to a minimum width at the distal end 20. The decreasing channel width is chosen to accommodate the tapered shape of the strain relief boot fixed to the optical fiber cable connector.

The length of the curved optical fiber cable routing guide 10 is determined by the radius of curvature R and the angle θ through which it is desired to bend the optical fiber cable. The minimum radius of curvature (sharpest bend) allowable for many optical cables is in the range of 0.8–1.5 inches. For many applications it is desirable to bend the cable through an angle of approximately 90°. By choosing a length of the cable routing guide 10 resulting in an angle θ in the range of 65°–80°, the desired bend of the cable through 90° may be achieved by a shorter cable guide 10 requiring less clearance behind the system unit mounted in a cabinet or drawer enclosure.

In the preferred embodiment, the optical fiber cable routing guide 10 is fabricated as a single piece of a polycarbonate material formed by a molding process, or alternatively, by a machining process. Alternatively, other stiff plastic materials including polyvinyl chloride (PVC) and acronitrile butadiene styrene (ABS) or metals including aluminum, brass, copper and steel may be used to fabricate the cable guide 10. The material and the thickness of the outer curved wall 12, the inner curve wall 14 and the base 16 should be chosen to provide a sufficiently rigid structure to protect the optical fiber cable from damage due to sharp bends resulting from stresses applied to the cable routing guide 10. For a cable routing guide 10 made of polycarbonate, walls having thicknesses of approximately 0.1 inches were found to be adequate.

Figure 3:
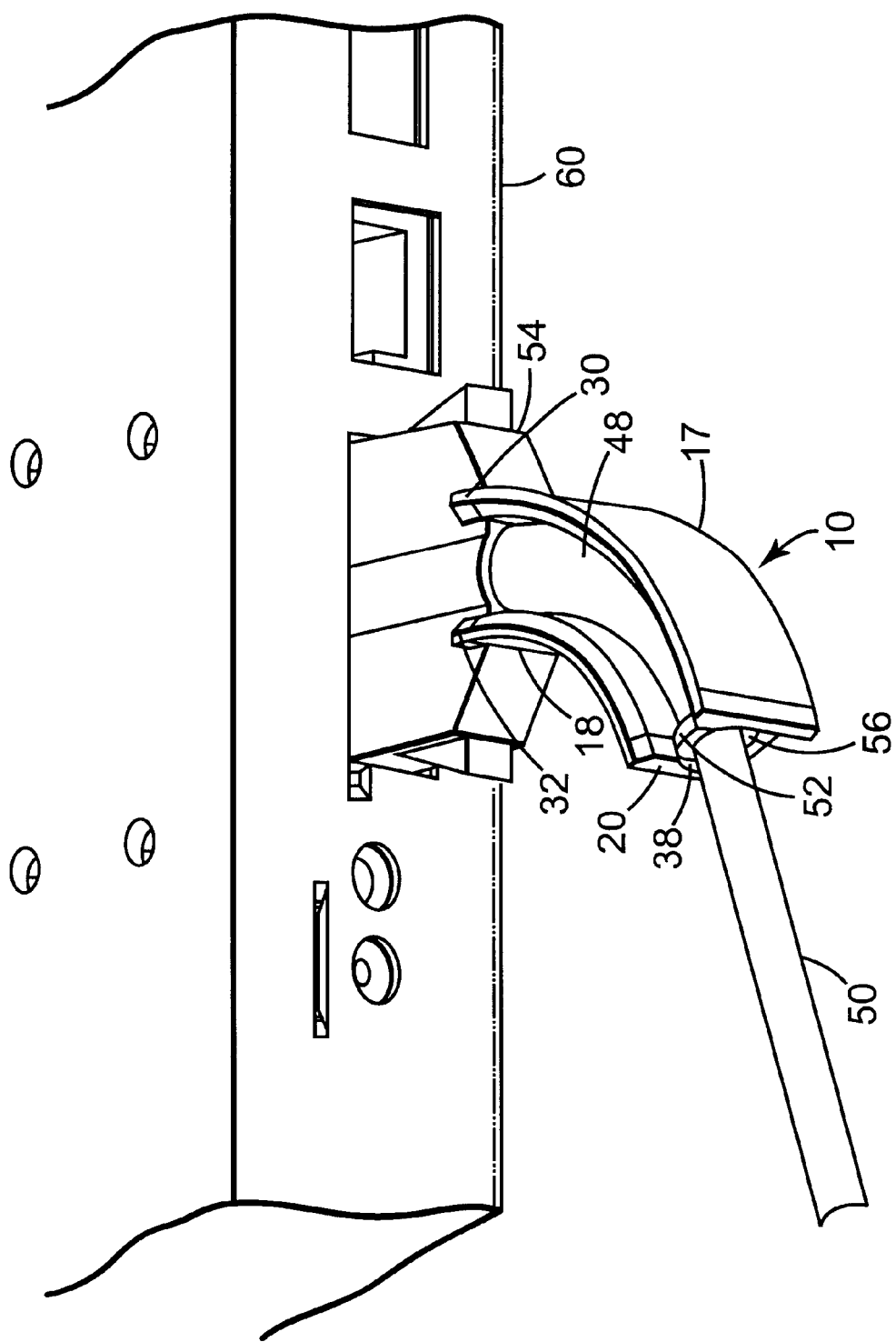
FIG. 3 is an isometric view (not to scale) of the optical fiber cable routing guide of the present invention installed at an optical fiber cable connector connected to a system unit.

FIG. 3 is an isometric view of an optical fiber cable routing guide 10 installed at an optical fiber cable connector 54 connected to a system unit 60. An optical fiber cable 50 comprising one or more optical fibers (not shown), suitable filler material and an outer protective sheath passes through the axial passage in a strain relief boot 48 fixed to the optical fiber cable connector 54 for connection of the optical fibers within the cable connector 54 as is known to the art. The optical fiber cable routing guide 10 is installed on the strain relief boot 48 with the proximal end 18 of the curved channel 17 in abutting contact with the cable connector 54. Protruding studs 30, 32 and the base protruding stud 34 (not shown) extend over the cable connector 54 to prevent rotation of the cable routing guide 10 relative to the cable connector 54. A protruding collar 52 at the second end 56 of the strain relief boot 48 is fitted into the recessed surface 38 at the distal end 20 of the curved channel 17 to hold the cable routing guide 10 in abutting contact with the cable connector 54.

The installed cable routing guide 10 controllably bends the strain relief boot 48 and the optical fiber cable 50 inside the boot through the desired angle while preventing sharp bends that can cause damage to the optical fibers within the cable 50. The installation illustrated in FIG. 3 shows the cable routing guide 10 bending the cable 50 toward the left. The cable guide 10 may be installed to bend the cable 50 to the right by rotating the cable guide through 180° relative to the cable connector 54 and installing it in this orientation.

While the preferred embodiment of the present invention has been illustrated herein in detail, it will be apparent that modifications and adaptations to this embodiment may occur to those skilled in the art without departing from the spirit, scope and teachings of the present invention as set forth in the following claims.

Accordingly, it is to be understood that the invention disclosed herein is not to be limited by the illustrated embodiment, but only by the scope of the appended claims.

We claim:

1. An optical fiber cable routing guide, comprising:
   an elongated curved channel for receiving and bending an optical fiber cable enclosed within a strain relief boot, said strain relief boot fixed at a first end to an optical fiber cable connector, the elongated curved channel having a proximal end and a distal end, wherein the proximal end of the elongated curved channel is shaped to make abutting contact with the optical fiber cable connector, and the distal end of the elongated curved channel is shaped to receive a collar formed at a second end of the strain relief boot, said elongated curved channel further comprising:
      an inner curved wall having a upper edge and a lower edge;
      an outer curved wall having an upper edge and a lower edge; and
      a base disposed between the inner curved wall and the outer curved wall, a first edge of said base fixed to the lower edge of the inner curved wall and a second edge of said base fixed to the lower edge of the outer curved wall.

2. The optical fiber cable routing guide as recited in claim 1, wherein the elongated curved channel is made of polycarbonate.

3. The optical fiber cable routing guide as recited in claim 1, wherein the elongated curved channel is made from one of a group of materials consisting of polycarbonate, polyvinyl chloride (PVC) or acrylonitrile butadiene styrene (ABS).

4. The optical fiber cable routing guide as recited in claim 1, wherein the inner wall, the outer wall and the base of the elongated curved channel have thicknesses in the range of 0.08 to 0.12 inches.

5. The optical fiber cable routing guide as recited in claim 1, wherein the elongated curved channel is made from one of a group of materials consisting of aluminum, brass, copper, and steel.

6. The optical fiber cable routing guide as recited in claim 1, wherein the elongated curved channel is formed to have a channel width that decreases gradually from a maximum width at the proximal end to a minimum width at the distal end.

7. An optical fiber cable routing guide, comprising:
   an elongated curved channel for receiving and bending an optical fiber cable enclosed within a strain relief boot, said strain relief boot fixed at a first end to an optical fiber cable connector, the elongated curved channel having a proximal end and a distal end, wherein the proximal end of the elongated curved channel is shaped to make abutting contact with the optical fiber cable connector, and the distal end of the elongated curved channel is shaped to receive a collar formed at a second end of the strain relief boot, said elongated curved channel further comprising:
      an inner curved wall having a upper edge and a lower edge;
      an outer curved wall having an upper edge and a lower edge; and
      a base disposed between the inner curved wall and the outer curved wall, a first edge of said base fixed to the lower edge of the inner curved wall and a second edge of said base fixed to the lower edge of the outer curved wall;
   wherein the proximal end of said elongated curved channel includes:
      a protruding stud at the upper edge of the inner curved wall;
      a protruding stud at the upper edge of the outer curved wall; and
      a base protruding stud at the base fixed to the lower edges of the inner and outer curved walls;
   said protruding studs being shaped to prevent rotation of the optical fiber cable routing guide relative to the optical fiber cable connector when the proximal end of the elongated curved channel is in abutting contact with the optical fiber cable connector.

8. The optical fiber cable routing guide as recited in claim 7, wherein the elongated curved channel is made of polycarbonate.

9. The optical fiber cable routing guide as recited in claim 7, wherein the elongated curved channel is made from one of a group of materials consisting of polycarbonate, polyvinyl chloride (PVC) or acrylonitrile butadiene styrene (ABS).

10. The optical fiber cable routing guide as recited in claim 7, wherein the inner wall, the outer wall and the base of the elongated curved channel have thicknesses in the range of 0.08 to 0.12 inches.

11. The optical fiber cable routing guide as recited in claim 7, wherein the elongated curved channel is made from one of a group of materials consisting of aluminum, brass, copper, and steel.

12. The optical fiber cable routing guide as recited in claim 7, wherein the elongated curved channel is formed to have a channel width that decreases gradually from a maximum width at the proximal end to a minimum width at the distal end.

13. An optical fiber cable routing guide, comprising a substantially rigid curved channel extending from a distal end to a proximal end of the routing guide, the substantially rigid curved channel including an opening defined along a longitudinal axis of the channel for receiving and bending an optical fiber cable connected to an optical fiber cable connector, the substantially rigid curved channel having a predetermined radius of curvature and having at least one member at a proximal end shaped to engage the optical fiber cable connector to prevent rotation of the cable guide when make abutting contact with the optical fiber cable connector.

14. The optical fiber cable routing guide of claim 13, wherein the predetermined radius of curvature is constant.

15. The optical fiber cable routing guide of claim 13, wherein the predetermined radius of curvature varies from the distal end to the proximal end.

16. The optical fiber cable routing guide of claim 13, wherein the width of the curved channel increases from the distal end to the proximal end.

17. The optical fiber cable routing guide of claim 13, wherein the at least one member further comprises a pair of protruding studs and a base protruding stud to prevent rotational motion of said cable routing guide upon making abutting contact with the fiber cable connector.

18. The optical fiber cable routing guide of claim 13, further comprising a recessed surface at the distal end formed by bevels of the inner surface of said channel.

* * * * *